United States Patent [19]

Schulz et al.

[11] E Re. 30,623

[45] Reissued May 26, 1981

[54] APPARATUS FOR SELECTIVELY HEATING AN INDIVIDUAL FOOD ITEM IN A REFRIGERATED ENVIRONMENT

[75] Inventors: William J. Schulz, West Cornwall, Conn.; Ralph R. Pecoraro, Jacksonville, Fla.; Gerard T. Hogan, Roscoe, Ill.

[73] Assignee: UOP Inc., Des Plaines, Ill.

[21] Appl. No.: 145,953

[22] Filed: May 2, 1980

Related U.S. Patent Documents

Reissue of:

[64] Patent No.: 4,180,125
Issued: Dec. 25, 1979
Appl. No.: 889,763
Filed: Mar. 24, 1978

[51] Int. Cl.[3] ..... F25B 29/00

[52] U.S. Cl. ..... 165/48 R; 165/64; 165/DIG. 26; 219/386; 219/400; 312/236

[58] Field of Search ..... 165/DIG. 25, DIG. 26, 165/48, 64; 312/236; 219/386, 387, 400, 432, 433, 438; 126/246, 268

[56] References Cited

U.S. PATENT DOCUMENTS

| | | | |
|---|---|---|---|
| 3,830,148 | 8/1974 | Shevlin | 219/387 X |
| 3,908,749 | 9/1975 | Williams | 165/61 X |
| 4,005,745 | 2/1977 | Colato et al. | 165/61 X |
| 4,087,142 | 5/1978 | Aumack | 312/236 |
| 4,110,587 | 8/1978 | Souder et al. | 219/386 X |

FOREIGN PATENT DOCUMENTS

| | | | |
|---|---|---|---|
| 1219352 | 5/1960 | France | 312/236 |

*Primary Examiner*—Albert W. Davis
*Assistant Examiner*—Margaret A. Focarino
*Attorney, Agent, or Firm*—James R. Hoatson, Jr.; Barry L. Clark; William H. Page, II

[57] ABSTRACT

A cabinet type enclosure, preferably in the form of a cart, which is adapted to be connected to a source of refrigeration for refrigerating a plurality of food items on a plurality of meal trays positioned in the enclosure has a plurality of thin, generally horizontal fixedly mounted heater shelf members extending into the enclosed space from one side wall thereof. The heater shelf members are adapted to be moved relative to and under hot food containers positioned on the trays to heat same. The enclosure also has pairs of tray guides on its opposing side walls. The meal trays have integral transverse abutment means which extend over a portion of the tray surface at a location above the surface. The transverse abutments cooperate with a container for hot food placed on the tray between the abutment means for preventing movement of the hot food container past the transverse abutment means by frictional contact with the heater shelf as the tray is moved into or out of the enclosure and relative to the heater shelf along the tray guides. The heater shelf members are positioned so that they will pass between the tray surface and the bottom of the abutment means. A ramp-like end on the heater shelf will engage and lift the chamfered bottom of a container to be heated so that the container will be gently lifted upwardly onto the heater shelf as the tray is moved to a position overlying a heating element on the heater shelf. The apparatus is particularly useful for inflight feeding as well as for institutional feeding.

11 Claims, 7 Drawing Figures

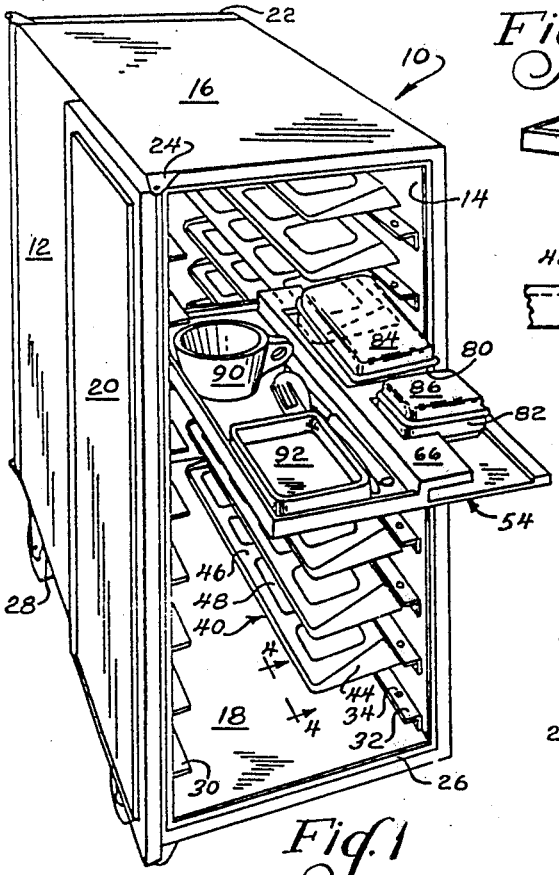
Fig. 1
Fig. 3
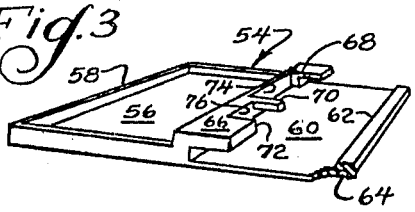
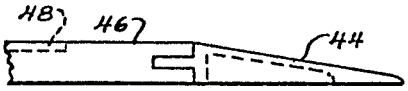
Fig. 4
Fig. 5
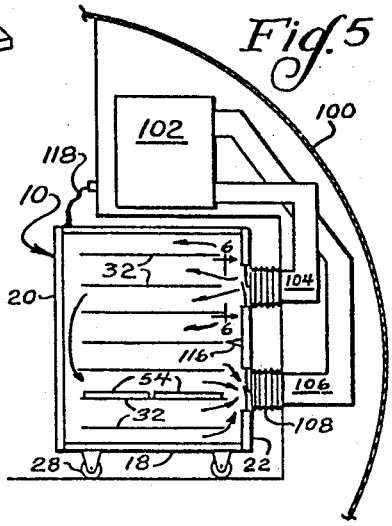
Fig. 2
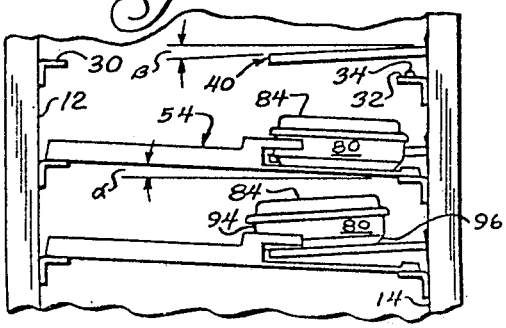
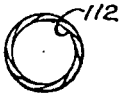
Fig. 6
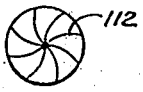
Fig. 7

APPARATUS FOR SELECTIVELY HEATING AN INDIVIDUAL FOOD ITEM IN A REFRIGERATED ENVIRONMENT

Matter enclosed in heavy brackets [ ] appears in the original patent but forms no part of this reissue specification; matter printed in italics indicates the additions made by reissue.

BACKGROUND OF THE INVENTION

The invention relates to the heating and cooling of food items on meal trays in inflight, institutional or similar types of mass feeding operations. In all of such operations it is desirable that the food reach the person for whom it is intended in a tasteful condition with the hot items hot and the cold items cold. A minimum of handling of the trays is also desirable to reduce the labor cost of serving and a minimum of weight is desirable to ease handling and reduce cost. The weight aspect is especially important for inflight feeding systems. Numerous patentees have attempted to resolve the problem but none completely successfully. Patents related to this subject matter include U.S. Pat. Nos.: Reynolds 2,616,269, Hilliker 2,919,339, Bauman 3,042,384, Traycoff 3,129,041, Foster et al 3,199,579, Stenz 3,205,033, Stenz et al 3,275,393, Nicolaus et al 3,389,946, Golden 3,408,481, Shevlin 3,608,627, 3,725,645, 3,784,787 and 3,830,148, Stevenson 3,615,713, Williams 3,908,479, Mack et al 3,924,100, Colato et al 4,005,745, Shumrack et al 4,041,277, Wyatt 4,052,589 and Tricault French Pat. No. 1,219,352. Some of these systems provide separate hot and cold compartments for hot and cold items and require the assembly of the hot items to the tray of cold items before serving. This is wasteful of labor and, in the case of hospitals, can make it possible for a patient on a restricted diet to receive the wrong food items. Other of these patents require heavy, bulky hot food containers which include integral heaters. There are also systems where each food tray must have its own heater elements. Reynolds teaches heating liquid or solid food in a container in a refrigerated atmosphere but the food is not on a tray. Others, such as Colato et al U.S. Pat. No. 4,005,745 and the Tricault French Pat. No. 1,219,352 also heat in a refrigerated atmosphere with the food items being on trays and with the hot food container being normally positioned in a hole in the tray which supports its side edges during carrying. The hole permits the hot food container to be positioned directly over a heating element which is located so as to lift the hot container from the tray as it is being heated. This type of system assures excellent direct contact between the heater and container but presents a danger that a person could be burned or could spill the tray if he accidently put his fingers under the hot dish. The danger would be minimal in a hospital where the tray server places the meal on the bed table but would be much more significant in an aircraft where the passengers often assist in the passing of trays to the window seat. Furthermore, the grabbing of the tray by the passenger on its close edge with his fingers under the entree portion of what he assumes is a solid tray would possibly cause his fingers to propel the entree into his lap or his neighbor's while the rear edge of the tray falls for lack of support, thereby dumping the cold items on someone's legs or the floor. The aforementioned spillage problem could be avoided by using a second tray under the apertured one during serving but this would take assembly time on the part of the server and introduce additional weight to the aircraft.

SUMMARY

It is among the objects of the present invention to provide an apparatus for storing, refrigerating and heating meals, especially aboard aircraft, in such a manner that the food, both hot and cold, will reach the consumer thereof in an optimum temperature condition, while requiring no expenditure of time on the part of the server to assemble the items which constitute the meal.

It is another object of this invention to provide such an apparatus that is light in weight and easy to sterilize.

These and other objects are achieved by the system or apparatus of the present invention wherein portions of the tray carrying enclosure or cabinet, which is preferably in the form of a cart, cooperate with portions of the trays and at least the hot food containing dishes thereon to heat such dishes by applying heat directly to their bottoms while the dishes are temporarily positioned above the solid bottom surface of the tray. The cabinet or enclosure contains a plurality of vertically spaced side guide rails for supporting a plurality of meal service trays in a normally refrigerated atmosphere. To maximize their storage capacity the cabinets preferably are deep enough to accommodate two trays end to end in their longest dimension on each set of guide rails. A generally horizontal thin heater shelf is located in the cabinet in association with each set of side guide rails. The heater shelves are preferably wired so that at least some shelves can be left unheated when the cabinet is not fully loaded. The shelves extend from one side wall of the cabinet such that the top surfaces of the entree or passenger facing halves of the trays can be slid under the heater shelves as the trays are loaded into the cabinet. Each heater shelf has heater elements positioned along its length at locations which correspond to the final location in the cabinet of the entree or other dishes to be heated. The heater shelves are preferably of resin and glass mat laminated construction and the heater elements, which can be of various constructions such as etched metal, resistive wire, resistive powder metal, carbon semiconductors or a pyropolymer such as disclosed in Tadewald U.S. Pat. No. 3,973,103, are preferably embedded in the laminate. There can be one heater element per tray or more than one if it is desired to have the tray contain more than one hot dish. Suitable detent means such as a dimple in the tray bottom and a cooperating bump on the guide rail can be used to properly register the trays and heaters, thus assuring proper heating and cooling. The heater shelves are tapered at at least one end thereof and preferably both where the cabinet can be loaded or unloaded from each end. The taper can be formed in any suitable manner such as by machining an untapered laminate member or by embedding a metal or plastic member of appropriate tapered shape in a laminate as it is being formed. The taper provides a ramp surface which the hot dishes ride up on in order to reach the top surface of the heater shelf. The hot dishes must maintain a relatively fixed longitudinal position relative to the tray surface as the tray is slid along the guide rails. This relationship is maintained by virtue of a pair of transverse abutment portions which are integral with the tray. The abutment portions intercept the preferably vertical upper edge portions of the ends of the hot dish and keep the dish from traveling with the heater shelf which is moving under it in a relative sense when the tray enters or leaves the cabinet. The heater shelves should be wide enough to be completely under the hot dishes and the abutment means must project sufficiently far to intercept the hot dishes and maintain their orientation. The active or container contacting portions of the abutment means must be vertically spaced from the tray surface a sufficient distance to avoid interference with the heater shelf. A longitudinally extending abutment is also preferably provided which can contact the rear side of the hot dish. It is desirable to force the hot dish against the longitudinally extending abutment to better retain the hot dish in position on the tray as the tray passes under the heater shelf. Although the tray and guide rails can be horizontal, retention can be slightly assisted by mounting the guide rails so that the tray will be slightly tilted downwardly (about 2½°), and thus assisted by gravity during insertion to move toward the heater shelf side of the cabinet and engagement with the cart wall or the detent means. It is quite desirable to mount the heater shelves so as to tilt downwardly (about 2½°) toward the center of the cabinet. Gravity can then help force the dishes on the shelves against the longitudinally extending abutment. The angle of the heater shelves also assists in the draining of water from the shelves when the cabinet is washed.

The cart interior is normally maintained at a temperature cooler than ambient and can be cooled in any suitable manner such as by being moved into contact with supply and return ducts of a refrigeration unit built into the galley of an aircraft, for example. The air can pass through a first port in the cart, circulate over the trays, and exit through a second port. Alternatively, the galley unit could be formed to sealingly engage with an end of a cart whose door is opened. Other cooling means could be used such as a nozzle which injects liquid nitrogen into the cart. Dry ice or regular ice could also be used as an external source of cooling air or could be placed in a cart.

BRIEF DESCRIPTION OF THE DRAWINGS

FIG. 1 is a perspective view showing a meal tray being loaded into a combination meal tray storage and serving cart;

FIG. 2 is a fragmentary front view of a portion of the cart shown in FIG. 1 illustrating the heater shelves and the relationship between a heater shelf and a hot food containing container before and after engagement of the container with the heater shelf;

FIG. 3 is a perspective view of a tray in accordance with the invention with a portion of one corner removed to illustrate a detent means for retaining the tray in a fixed position relative to one of the guide rails in the serving cart;

FIG. 4 is a view taken on line 4—4 of FIG. 1 illustrating the ramp portion of the heater shelf;

FIG. 5 is a somewhat schematic representation of the relationship between the cart of FIG. 1 and a food chilling unit which is integrally housed inside an aircraft;

FIG. 6 is a view taken on line 6—6 of FIG. 5 showing an iris type air inlet port in the cart; and FIG. 7 is a view showing the iris mechanism of FIG. 6 in the closed position which it would assume when the cart is disconnected from the chilling unit.

DESCRIPTION OF THE PREFERRED EMBODIMENT

Referring to FIG. 1 a meal tray storage and service cart is indicated generally at 10. The cart has side walls 12, 14, a top wall 16 and a bottom wall 18 which, together with pivoted doors 20, 22 mounted to the cart by hinges 24, define an enclosure which is preferably sealed by a flexible sealing strip 26. All of the walls are preferably insulated. The cart 10, as shown, is particularly well adapted for use in an aircraft wherein wheels 28 permit the unit to be rolled from its storage position in the galley as indicated in FIG. 5 to its serving position wherein it is rolled up and down the aircraft aisle by the flight attendants. By providing doors 20, 22 at each end of the cart, it is possible to have attendants simultaneously serving meals from each end of the cart.

Positioned on the inside of wall 12 are a plurality of guide rail members 30 which may be attached to the wall by screws, spot welding or other fastening means. Extending from the inner wall of the opposite side 14 of the cart are somewhat similar guide rails 32 which are preferably positioned at a slightly lower level than the corresponding rails 30 on the opposing side 12. Tray retaining projections 34 are formed in any suitable manner at two locations on the rails 32 and serve to define the positioning of the two trays 54 carried by each set of guide rails within the cart. Positioned slightly above the lowermost guide rails 32 are fixed heater shelves indicated generally at 40 which may be screwed or otherwise fastened to the side walls 14. The heater shelves 40 include a tapered ramp portion 44 on at least one end and preferably both ends where the cart is to be loaded or unloaded from either end as well as an elongated longitudinal portion 46, preferably of a resin and glass laminate, in which are mounted electrical heating elements 48. The number of heating elements 48 is determined by the number of hot dishes to be heated. In the present embodiment, we have shown two hot dishes on each tray 54 with there being two trays on each set of guide rails 30, 32. However, a single heater for each tray would also be suitable if only one entree dish needs heating. The tray 54 can be seen in more detail in FIG. 3 wherein it can be seen that the tray includes a large flat surface 56 at its rear for cold foods, a coffee cup and silverware for example. An edge portion 58 surrounds the outside of the cold surface and contributes to the rigidity of the tray in addition to its function of retaining items from sliding off the tray. A second portion 60 of the tray 54 comprises an extended flat surface area 60 for receipt of hot foods with the foods being prevented from sliding off the tray by a raised front edge portion 62. A recessed detent portion 64 is preferably provided in one corner of the tray and is designed to cooperate with complementary retaining projections 34 formed on the rails 32 in order to positively locate the trays 54 inside the unit 10 as shown in FIG. 5 so that air will be free to circulate around the ends of the trays. A raised central rib portion 66 separates the cold portion 56 from the hot portion 60 of the tray and may provide some degree of insulation between the hot and cold portions as well as providing support for the transverse abutment portions 68, 70, 72 whose function will presently be described. The raised portion 66 also may define longitudinal abutment portions 74, 76 which limit rearward movement of containers 80, 82.

As seen in FIG. 1, a hot entree dish 80 and a secondary hot dish 82, which may be omitted, are covered with heat and moisture retaining covers 84, 86 respectively. The entree dish 80 is preferably made of a ceramic or plastic material which will permit the entree to remain in a hot condition until served, even though the cart 10 is disconnected from its source of power during the serving operation. A coffee cup 90 and a dish 92 for a salad, dessert or other cold item is provided on the unheated portion 56 of the tray. As seen in FIG. 2, the side edges 94 of the entree dish 80 are generally vertical while the bottom of the dish is generally chamfered as shown at 96. When a tray 54 is loaded into the cart 10 as shown in FIG. 1, the chamfered dish bottom 96 engages and cooperates with the ramp edges 44 of the heater shelf 40 to generally cam up or lift the leading edge of the dish 80 upwardly until the dish overlies the heater shelf. The vertical dish edges 94 engage the transverse abutments 70 or 68 on the tray 54 depending upon whether the tray is being inserted into the cart 10 or removed therefrom. During insertion, the frictional engagement between the fixed heater shelf 40 and the dish 80 on the moving tray 54 will naturally tend to force the dish rearwardly against the abutment 70 while the friction force would of course be in the opposite direction during the removal of the tray from the cart. As previously mentioned, the guide rails 30, 32 are slightly vertically offset from each other. In FIG. 2 the angle of offset $\alpha$ as defined by the arrows is preferably about $2\frac{1}{2}°$. The heater shelves 40 are preferably mounted at a similar angle $\beta$ in the opposite direction so that as a tray and entree dish are loaded into the cart the dish 80 will be lifted and rotated as it encounters shelf ramp 44 from the upper position shown in FIG. 2 to the storage and heating position shown at the bottom of FIG. 2. In the storage and heating position, the respective $2\frac{1}{2}°$ angles of the tray and heater shelf cause a resultant 5° angle between the dish 80 and the bottom of the tray 54. This configuration minimizes spilling of any liquids within the container 80 while utilizing the effect of gravity to urge the container 80 into contact with the longitudinal abutment 74 as the tray 54 and container 80 are slid longitudinally over the surface 46 of the heater shelf 40. The angled relationship in cooperation with the complementary detent means 34, 64 insures that the hot dishes 80, 82 will be positioned exactly as desired relative to the heater plates 48. Little or no heat will be wasted since the heat will transfer directly to the overlying dishes 80, 82. The firm contact of the dishes 80, 82 with the longitudinal abutments 74, 76 also permits the transverse abutments 68, 70, 72 to be relatively short while still being effective, thus minimizing the possibility of these members being broken off during tray washing and handling operations.

FIG. 5 illustrates one manner in which the cart 10 may be mounted in a galley of an aircraft. The aircraft fuselage 100 is illustrated as containing a refrigeration unit 102 having inlet and outlet ducts 104, 106 to the cart 10 which are connected by bellows members 108 to normally covered openings in the door 22. The closures for the openings could be of any desired construction which would permit the cart to be sealed as it is being transported from the food preparation kitchen to the aircraft. For example, a flexible flap could be used or, as indicated in FIGS. 6 and 7, an iris assembly having movable blades 112 could be utilized. A baffle member 116 is preferably mounted between the walls 12, 14 of the cart to block direct passage of air between the inlet duct and outlet duct and insure that flow will be over the tray surfaces as indicated by the arrows. The heater elements 48 are wired through suitable switches (not shown) to a power cord 118 connected to the aircraft electrical supply. If desired, sufficient switches may be provided so that when the cart 10 is not filled with trays, the unused heater elements 48 may be switched off. A timer mechanism (not shown) may also be provided so that on a long flight, for example, the trays, including the items to be served hot, can be kept chilled. The heaters would then be activated at a sufficient time in advance of the meal serving time to heat the dishes to their serving temperature.

We claim as our invention:

1. An apparatus for heating at least one covered container on a meal service tray while other items on the tray are refrigerated comprising an enclosed housing having a plurality of cooperative pairs of guide rails therein for supporting a first pair of opposed side edges of a plurality of trays; means for supplying a refrigerated atmosphere within said enclosure; a plurality of generally horizontal, thin, heater shelves extending from a side wall of said housing for less than one-half the width of the trays; a ramp surface on at least one end of each of said heater shelves; a plurality of trays, each of said trays having at least one pair of abutment portions integrally supported by said trays and extending transversely over a portion thereof relative to said first opposed pair of side edges, said abutment portions being located sufficiently far above the serving surface of the trays to permit end contact with said at least one covered container while allowing the trays to be slid along said cooperating pairs of guide rails so that said thin heater shelves will pass above the tray surfaces and [beneath the] *under said container contacted by said* abutment portions, the ramp surface on each of said heater shelves being adapted to lift a covered container located on said tray between said at least one pair of abutments, [and] *whereby to* permit said heater shelf with which said container is frictionally engaged to pass under it as said container is restrained by one of said at least one pair of abutment portions.

2. The apparatus of claim 1 wherein said cooperative pairs of guide rails are located in said housing at a vertical offset relative to each other so that a tray resting on them will be at a slight angle to horizontal.

3. The apparatus of claim 2 wherein said heater shelves are located on the side wall of the housing which supports the lowermost of said pairs of guide rails, said heater shelves projecting downwardly toward the center of the housing at a slight angle to the horizontal.

4. The apparatus of claim 3 wherein the angle assumed by a tray on said guide rails and the angle of said heater shelves are each about $2\frac{1}{2}°$ so that a container resting on a heater shelf will be tilted at an angle of about 5° relative to the bottom of its tray.

5. The apparatus of claim 4 wherein said trays include a longitudinal abutment portion positioned intermediate spaced portions thereof which accommodate hot food and cold food, said last named container being biased by the effect of gravity and its angle of tilt relative to said tray into engagement with said longitudinal abutment portion.

6. The apparatus of claim 1 wherein said heater shelves are principally of laminated resin and glass construction with heater elements embedded therein at spaced locations.

7. The apparatus of claim 6 wherein said ramp surfaces are formed of a non-laminated material having a retaining portion positioned internally of said laminated construction.

8. The apparatus of claim 1 wherein said trays and at least one of each of said pairs of guide rails include complementary detent means to positively locate each of said trays within said enclosed housing at a predetermined distance from a door mounted thereon.

9. The apparatus of claim 1 wherein said means for supplying a refrigerated atmosphere comprises a pair of selectively closable openings in a door portion of said apparatus, said openings being adapted to be connected to a pair of inlet and outlet ducts attached to an air chilling unit.

10. The apparatus of claim 9 wherein said enclosed housing has a baffle member mounted in one end thereof for preventing the flow of chilled air directly from the inlet opening to the outlet opening without passing back and forth over the trays mounted in the housing.

11. The apparatus of claim 1 wherein said covered container has generally vertical side edges which are chamfered at the bottom to coact with said ramp surface to facilitate the lifting of said container by said ramp surface.

* * * * *